US 8,458,584 B1
Jun. 4, 2013

(12) United States Patent
Wilson et al.

(54) EXTRACTION AND ANALYSIS OF USER-GENERATED CONTENT

(75) Inventors: Jonathan D. Wilson, Santa Clara, CA (US); Tomislav Nad, Mountain View, CA (US); Xinjie Zheng, Shanghai (CN)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 12/949,485

(22) Filed: Nov. 18, 2010

Related U.S. Application Data (60) Provisional application No. 61/359,165, filed on Jun. 28, 2010.

(51) Int. Cl.
*G06F 7/06* (2006.01)

(52) U.S. Cl.
USPC ........... 715/234; 715/230; 707/741; 707/736; 707/706; 707/711; 706/12

(58) Field of Classification Search
USPC ...... 715/230, 234; 707/737, 740, 726; 706/12
See application file for complete search history.

(56) References Cited

U.S. PATENT DOCUMENTS

| | | | |
|---|---|---|---|
| 6,219,833 B1 | 4/2001 | Solomon et al. | |
| 6,571,234 B1 * | 5/2003 | Knight et al. | 1/1 |
| 6,691,104 B1 | 2/2004 | Kraft et al. | |
| 7,103,838 B1 | 9/2006 | Krishnamurthy et al. | |
| 7,203,679 B2 | 4/2007 | Agrawal et al. | |
| 7,373,606 B2 | 5/2008 | Gorzela | |
| 7,555,480 B2 * | 6/2009 | Zhang et al. | 1/1 |
| 7,599,931 B2 * | 10/2009 | Shi et al. | 1/1 |
| 7,627,571 B2 | 12/2009 | Jing et al. | |
| 7,660,804 B2 | 2/2010 | Wen et al. | |
| 7,814,048 B2 * | 10/2010 | Zhou et al. | 707/602 |
| 7,930,302 B2 * | 4/2011 | Bandaru et al. | 707/737 |
| 7,941,420 B2 * | 5/2011 | Chitrapura et al. | 707/709 |
| 7,949,643 B2 | 5/2011 | Kawale et al. | |
| 8,041,713 B2 * | 10/2011 | Lawrence | 707/726 |
| 8,051,083 B2 * | 11/2011 | Lai et al. | 707/737 |
| 8,099,408 B2 | 1/2012 | Zhang et al. | |
| 8,122,005 B1 * | 2/2012 | Juang et al. | 707/710 |

(Continued)

OTHER PUBLICATIONS

Si et al, "A Template-Based Forum Posts Content Extraction Method", 2011, IEEE, pp. 38-41.*

(Continued)

*Primary Examiner* — Cesar Paula
*Assistant Examiner* — Mohammed-Ibrahim Zuberi
(74) *Attorney, Agent, or Firm* — Brake Hughes Bellermann LLP (57) ABSTRACT

A page splitter may be configured to split a first page of a site into first boilerplate and first posts, and a second page of the site into second boilerplate and second posts. An aggregator may be configured to associate the first page with the second page, based on a similarity of the first boilerplate and the second boilerplate, and configured to associate at least one of the first posts and at least one of the second posts with a first post-type, and at least one of the second posts with a second post-type. A merger may be configured to merge the first boilerplate and the second boilerplate into a boilerplate template, posts of the first post-type from the first page and from the second page into a first post-type template, and posts of the second post-type from the second page into a second post-type template, and further configured to merge the boilerplate template, the first post-type template, and the second post-type template into a site template associated with the site.

25 Claims, 5 Drawing Sheets

U.S. PATENT DOCUMENTS

| | | | |
|---|---|---|---|
| 8,185,482 B2 * | 5/2012 | Yang et al. ............... | 706/12 |
| 8,229,910 B2 | 7/2012 | Jania et al. | |
| 8,402,021 B2 * | 3/2013 | Nad et al. ............... | 707/726 |
| 2006/0101003 A1 | 5/2006 | Carson et al. | |
| 2006/0112036 A1 * | 5/2006 | Zhang et al. ............ | 706/20 |
| 2006/0136193 A1 | 6/2006 | Lux-Pogodalla et al. | |
| 2006/0161542 A1 | 7/2006 | Cucerzan et al. | |
| 2006/0287989 A1 | 12/2006 | Glance | |
| 2007/0208703 A1 | 9/2007 | Shi et al. | |
| 2007/0294230 A1 * | 12/2007 | Sinel et al. .............. | 707/3 |
| 2008/0005234 A1 | 1/2008 | Newnam et al. | |
| 2008/0016087 A1 | 1/2008 | Zhang et al. | |
| 2008/0046441 A1 * | 2/2008 | Wen et al. ............... | 707/100 |
| 2008/0082607 A1 * | 4/2008 | Sastry et al. ............ | 709/204 |
| 2008/0208975 A1 | 8/2008 | Olive | |
| 2008/0215541 A1 * | 9/2008 | Li et al. .................. | 707/3 |
| 2009/0112865 A1 | 4/2009 | Vee et al. | |
| 2009/0307196 A1 * | 12/2009 | Shuster .................. | 707/3 |
| 2009/0319518 A1 | 12/2009 | Koudas et al. | |
| 2010/0138415 A1 | 6/2010 | Lein | |
| 2010/0205168 A1 * | 8/2010 | Yang et al. .............. | 707/709 |
| 2010/0211533 A1 * | 8/2010 | Yang et al. .............. | 706/12 |
| 2010/0299326 A1 | 11/2010 | Germaise | |
| 2010/0312769 A1 * | 12/2010 | Bailey et al. ........... | 707/740 |
| 2011/0225115 A1 * | 9/2011 | Moitra et al. ........... | 706/50 |

OTHER PUBLICATIONS

Cai et al, "iRobot: An Intelligent Crawler for Web Forums", Apr. 21-25, 2008, World Wide Web Conference Committee, pp. 447-456.*

Zheng et al, "Joint Optimization of Wrapper Generation and Template Detection", Aug. 12-15, 2007, KDD, pp. 894-902.*

Faheem et al, "Intelligent and Adaptive Crawling of Web Applications for Web Achiving", Nov. 27, 2012, pp. 1-23.*

Hu et al, "Complete-Thread Extraction from Web Forums", 2012, Springer-Verlag Berlin Heidelberg, pp. 727-734.*

Zhai et al, Structured Data Extraction from the Web Based on Partial Tree Alignment, Dec. 2006, IEEE Transactions on Knowledge and Data Engineering vol. 18 No. 12, pp. 1614-1628.*

Wang et al, "Exploring Traversal Strategy for Web Forum Crawling", Jul. 20-24, 2008, SIGIR '08, pp. 459-466.*

Guo et al, "Board Forum Crawling: A Web Crawling Method for Web Forum", 2006, IEEE Computer Society, 4 Pages.*

Gruhl et al, "A Really Simple System for Web Scale RSS", May 23-26, 2006, IW3C2, pp. 183-192.*

Glance et al, "Analyzing Online Discussion for Marketing Intelligence", 2005, ACM Press, pp. 1172-1173.*

G.A. Michne, "Applied text analytics for blogs", 2007, University of Amsterdam, 298 pages.*

Dringus, et al, "Using Data Mining as a Strategy for Assessing Asynchronous Discussion Forums", 45 Computers & Education (2005), pp. 141-160.

Limanto, et al., "An Information Extraction Engine for Web Discussion Forums", ACM's WWW 2005, May 10-14, 2005, pp. 978-979.

Turpin, et al., "Fast Generation of Result Snippets in Web Search", ACM's SIGIR 2007, Jul. 23-27, 2007, pp. 127-134.

Wang, et al., "Exploring Traversal Strategy for Web Forum Crawling", ACM's SIGIR 2008, Jul. 20-24, 2008, pp. 459-466.

International Application No. PCT/US2009/052488, Notification of Transmittal of the International Search Report and the Written Opinion of the International Searching Authority, Feb. 25, 2010, 13 pages.

Bertino, et al., A matching algorithm for measuring the structural similarity between an XML document and a DTD and its applications, 2003, Elsevier Science, Ltd., 24 pages.

Eissen, et al., "The Suffix Tree Document Model Revisited", Proceedings of I-KNOW '05, Jun. 29-Jul. 1, 2005, 8 pages.

Tekli, et al, "Efficient XML Structural Similarity Detection using Sub-Tree Commonalities", SBBD, 2007, 17 pages.

* cited by examiner

FIG. 5

EXTRACTION AND ANALYSIS OF USER-GENERATED CONTENT

CROSS REFERENCE TO RELATED APPLICATION

This application claims priority under 35 U.S.C. §119 to Provisional Patent Application 61/359,165, filed Jun. 28, 2010, titled "EXTRACTION AND ANALYSIS OF USER-GENERATED CONTENT," which is incorporated herein by reference in its entirety.

TECHNICAL FIELD

This description relates to extraction and analysis of user-generated content.

BACKGROUND

In public and private networks, it is common for a content provider to make content available to other network users. For example, a publisher of a website may provide content to users of the public internet. More generally, content may be hosted on a server and made available over a network(s) for viewing or other receipt by other devices on the network, and by users thereof.

In many scenarios, it is possible for network users to contribute directly to such provided content. For example, a website provider may host a website which provides content to a plurality of network users. Further, the website may be enabled to receive additional, user-supplied content, which may then be added to the website and thereby made available to other users. In this way, the website provider may provide a forum in which users may contribute or define the development of the overall content of the website.

Many examples exist of such sites which are at least partially user-generated. For example, bulletin boards may be provided on the Internet in which a site provider provides a forum for users to post opinions or other information, often about a particular designated topic. As another example, website providers may host one or more sites which are designed to allow users to create and update individual blogs, in which each user posts content or other information. In yet another example, content providers, e.g., newspapers or magazines, may provide a comments section after each article or other piece of information, so that individual users may provide opinions or other comments about the related article/information.

In general, it is desirable to be able to catalog, access, or otherwise characterize discrete elements of information (e.g., webpages or portions thereof) which are available on a network. For example, such characterizations may enable searching of the characterized content, so that desired information may be located therein. In another example, such characterizations may enable advertisers or other users to make a determination as to the suitability of the characterized information for a desired purpose (e.g., for association with a particular advertisement).

In practice, however, it is often difficult to develop such characterizations of the type of user-generated content referenced above. For example, such user-generated sites may vary greatly with respect to one another, e.g., in terms of format and content. Moreover, even within a particular site, it may occur that the individual nature of the various contributing users, among other factors, may lead to a great variation of the overall resulting content and format.

Consequently, it may be difficult to identify, extract, and/or characterize desired information from such user-generated content. As a result, a value of such user-generated sites may be reduced with respect to content providers, advertisers, viewers, or other users thereof.

SUMMARY

According to one general aspect, a computer system including instructions stored on a computer-readable medium may include a page splitter configured to cause at least one processor of the computer system to split a first page of a site into first boilerplate and first posts, and a second page of the site into second boilerplate and second posts. The computer system may include an aggregator configured to cause at least one processor of the computer system to associate the first page with the second page, based on a similarity of the first boilerplate and the second boilerplate, and configured to associate at least one of the first posts and at least one of the second posts with a first post-type, and at least one of the second posts with a second post-type. The computer system may include a merger configured to cause at least one processor of the computer system to merge the first boilerplate and the second boilerplate into a boilerplate template, posts of the first post-type from the first page and from the second page into a first post-type template, and posts of the second post-type from the second page into a second post-type template, and further configured to merge the boilerplate template, the first post-type template, and the second post-type template into a site template associated with the site.

According to another general aspect, a computer-implemented method including executing instructions stored on a computer-readable medium may include splitting a first page of a site into first boilerplate and first posts and a second page of the site into second boilerplate and second posts. The method may include associating the first page with the second page, based on a similarity of the first boilerplate and the second boilerplate, and associating at least one of the first posts with a first post-type, at least one of the second posts with the first post-type, and at least one of the second posts with a second post-type. The method may include merging the first boilerplate and the second boilerplate into a boilerplate template, and merging posts of the first post-type from the first page and from the second page into a first post-type template, and merging posts of the second post-type from the second page into a second post-type template. The method may include merging the boilerplate template, the first post-type template, and the second post-type template into a site template associated with the site.

According to another general aspect, a computer program product may be tangibly embodied on a computer-readable medium and may include executable code that, when executed, is configured to cause a data processing apparatus to split pages of a site containing user-generated content into boilerplate and post data, aggregate a page group of the split pages, based on similarity of boilerplate contained within the page group, aggregate groups of the posts within and among the pages of the page group, based on a post-type of posts within each group of posts, analyze posts of each post-type and corresponding post group, to extract elements therefrom, and annotate the elements based on annotation criteria for inclusion within post-type templates corresponding to each post-type and corresponding post group.

The details of one or more implementations are set forth in the accompanying drawings and the description below. Other features will be apparent from the description and drawings, and from the claims.

DETAILED DESCRIPTION

Figure 1:
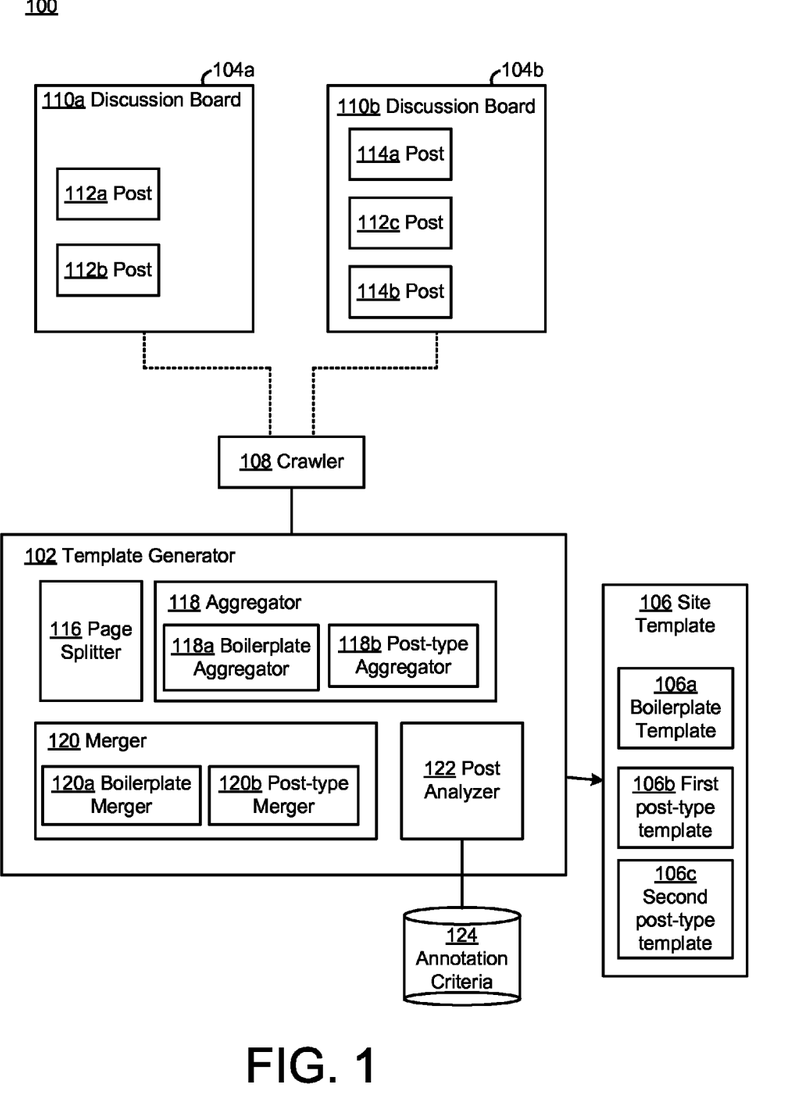
FIG. 1 is a block diagram of a system for extracting and analyzing user-generated network content.

FIG. 1 is a block diagram of a system 100 for extracting and analyzing user-generated network content. In the example of FIG. 1, a template generator 102 may be configured to receive pages 104A, 104B of a network site, and to generate a site template 106 which may be applied to current or future pages of the network site to thereby characterize included information, such as user-generated content. For example, such characterization of user-generated content may include annotation and/or classified storage thereof. In this way, information provided by (or contained within) the network site may be accurately characterized, so that a user and value of the network site may correspondingly be increased.

In FIG. 1 and in many of the following examples, it is assumed that a provider hosts the pages 104A, 104B as part of a larger network site which is made available to users of the network. For example, a website provider may store and/or generate the pages 104A, 104B, or elements thereof, and may provide pages 104A, 104B to authorized network users upon request. Consequently, in the following examples, it may be assumed that the referenced network may refer to or include the public internet, including the worldwide web (WWW), so that the site of which the pages 104A, 104B are a part may be referred to as a website, network site, site, or similar nomenclature. Of course, these are merely non-limiting examples, and the system of FIG. 1 should be understood to operate in the context of virtually any network in which content may be provided over the network to users thereof. For example, such networks may include other wide are networks, local area networks, personal area networks, internets, intranets, or other similar contexts.

Consequently, the pages 104A, 104B may represent virtually any type of page or other content which may be included in the types of sites just referenced. For example, the pages 104A, 104B may include bulletin board pages, discussion groups, micro-blogs, or blogspots. The pages 104A, 104B may include content including posts, blog entries, user comments, or virtually any other type of information which may include user-generated content. Of course, a given site may include a large number of pages, although in FIG. 1 only pages 104A and 104B are specifically illustrated, for the sake of clarity and conciseness.

The term user may generally refer to any human or computer user which is enabled to upload or otherwise provide content for inclusion within the pages 104A, 104B. As referenced above, for example, such user-generated content may include textual information provided by such users, e.g., about a particular topic associated with the pages 104A, 104B, and frequently presented in a "threaded" or other format used to group or designate related subsets of posts. In additional or alternative examples, such user-generated content may include virtually any type of information which may be displayed or otherwise provided using the pages 104A, 104B, e.g., images, audio, video, or any other type of content, or combinations thereof. Such user-generated content may be purely for informational purposes, and/or may have relevance to commercial activities, (e.g., may include items for sale).

During operation of the system 100, a crawler 108 (e.g., a web crawler) may be used to crawl some or all of the pages of a designated website, e.g., the website including the pages 104A, 104B. As referenced above, such a website may, of course, include many more pages than the pages 104A, 104B illustrated in the simplified example of FIG. 1. Moreover, a number of such pages may increase over time, e.g., as users continue to contribute or otherwise provide user-generated content or inclusion within the website.

Consequently, the crawler 108 may be instructed to crawl all of a number of existing pages of a designated website, or may be instructed to crawl a designated subset thereof. The website itself may be designated as a target for the crawler 108, e.g., directly by a user of the system 100, or as a result of an executed search for a particular type of website.

A structure and function of the crawler 108 are known in the art, and are not described herein in further detail, except as necessary to assist in understanding operations of the system 100. In general, however, the crawler 108 may be understood to be functional to inspect the pages 104A, 104B, and to extract and otherwise identify certain (types of) characteristics thereof.

For example, the pages 104A, 104B may be constructed using a markup language, in which tags or other identifiers are used to characterize content or other aspects of the pages 104A, 104B, so that the pages 104A, 104B may be rendered (e.g., by a browser or other client application) in a desired format. In the examples that follow, discussion is provided with respect to the hypertext markup language (HTML) commonly used to construct pages on the worldwide web (WWW). However, it will be appreciated that various other types of markup languages and variations thereof, also may be used in the context of the system 100. For example, related types of markup languages may include dynamic HTMl (DHTML), eXtensible Markup Language (XML), javascript, AJAX, or other types of markup languages, rendering techniques, or combinations thereof.

Continuing with the example of HTML, the crawler 108 may be operational to receive the page 104A and to analyze, extract, or otherwise characterize aspects of the underlying HTML source code. For example, as just referenced, HTML typically uses notations known as tags to specify a manner in which content of the page 104A will ultimately be rendered, e.g., within a browser. The crawler 108 may therefore inspect and extract such tags in order to characterize the page 104A.

For example, such tags may typically be used to specify a position, size, format, color, arrangement, or other aspect(s) of content of the page 104A. Specific manners in which such various types of information (e.g., content and/or tags) may be extracted by the crawler 108 for use in the system 100 are provided in more detail below, or would be apparent to one of skill in the art.

In the example of FIG. 1, as referenced above, it is assumed that the pages 104A, 104B represent pages which include user-generated content. The pages 104A, 104B also may include content that is provided by the provider of the pages 104A, 104B. As also referenced above, such pages exist in many different formats, e.g., on the public internet, including a wide variation in the type and presentation of both the user-generated content and of the associated provider content.

Consequently, it may be difficult to automatically characterize all content of the pages 104A, 104B. For example, it may be desired to characterize some or all of a page's user-generated content based on the date of creation of the content, and the content may include (as determined by the crawler 108) a number of six digit or eight digit numbers. Nonetheless, it may difficult to determine whether such six or eight digit numbers represent a date, or have some other significance, or no significance. Similarly, it may be possible to detect a name within the content of the pages 104A, 104B. However, it may be more difficult to determine whether such a name represents an author/creator (e.g., a contributing user) of the content, as opposed to e.g., a topic or subject of the content.

Thus, even with the use of the crawler 108, it may be difficult to accurately characterize content elements of the pages 104A, 104B. Further, as may be appreciated from the above discussion, the pages 104A, 104B represent examples of a large number and variation of pages which include user-generated content. As a result, even if techniques are developed which characterize certain pages or types of pages having user-generated content, such techniques may not necessarily be useful or applicable with respect to other such types of user-generated pages.

The template generator 102 is therefore functional to create the site template 106 which permits characterization of user-generated content, e.g., from virtually all pages of the site of which the pages 104A, 104B are a part, including such pages which may not yet be created at a time of creation of the site template 106. Further, by inputting crawled data from the crawler 108 with respect to other pages of other sites (not specifically illustrated in FIG. 1), the template generator 102 may generate corresponding site templates having similar functionality and advantages with respect to other such separate sites.

By generating such customized and site-specific site templates, the template generator 102 enables accurate automatic characterization of pages of such sites, even when such pages include various types, forms, and formats of user-generated content. In this way, the template generator 102 makes the pages 104A, 104B and similar pages more easily accessible, searchable, and otherwise useful.

In operation, the template generator 102 proceeds on the assumption or knowledge that pages 104A, 104B generally relate to broad categories of content. Specifically, the first such category may be assumed to be a substantially uniform, static, or unchanging portion, which is typically or often provided by a provider of the underlying site. Meanwhile, the second such broad category of content is assumed to include relatively or highly structured data that is generated by, and received from, readers or other users of pages 104A, 104B, and thereafter displayed on the pages 104A, 104B in such a structured or repetitive fashion. Moreover, such user-generated content may be assumed to be dynamically and perhaps unpredictably updated, so that corresponding new pages (e.g., 104C . . . 104n) may also be created.

In the present description, the first category of information is referred to as "boilerplate" content. As just referenced, such boilerplate content may generally be provided by (or in association with) an owner or other content provider of the pages 104A, 104B, and may have various purposes, or serve various functions. For example, such boilerplate content may be content which identifies a purpose, function, or other characteristic of a specific page and/or its underlying site. For example, such boilerplate content may include a name of the page or of the site.

In a specific example, in which the pages 104A, 104B refer to a bulletin board, the boilerplate content may include identification of a topic of the bulletin board. More generally, as referenced above, such boilerplate may include any content which is not provided on a dynamic basis by users of the site in question, which may include, for example, content (e.g., articles or announcements), advertisements, rules or other guidelines provided in association with the pages 104A, 104B, or any other content considered to be useful or necessary by the content provider with respect to use of the site in question.

In the specific example of FIG. 1, the page 104A includes boilerplate content 110A, illustrated in FIG. 1 as a title "discussion board." That is, as just described, the boilerplate content of 110A may include a title, topic, or other information included by a provider of the page 104A. Further, in page 104A includes user-generated content 112A, 112B, identified in the example of FIG. 1 as posts of one or more users to the page 104A.

Thus, as a matter of terminology and for the sake of example, the pages 104A, 104B may represent forums of the various types discussed above, or other types, in which site providers provide boilerplate content 110A, 110B, together with an opportunity for users to upload or otherwise provide or include user-generated content including posts 112A, 112B, as well as posts 112C and 114A, 114B of the page 104B, as shown. In this instance, it is known to use the term "post" to refer to contributions of users to bulletin boards and other discussion forums. However, the term post is used herein in a more general sense to refer to any action associated with posting (e.g., uploading, contributing, generating, or otherwise providing) content by users of the pages 104A, 104B. Consequently, such postings and associated posts may refer to or include any such user-generated content, including the examples provided herein, or other examples, as would be apparent to one of skill in the art, including, but not limited to, bulletin board messages, blog entries, image files, audio and/or video files, comments about an article or other topic, or items for sale.

In the example of FIG. 1, it is assumed that posts of the pages 104A, 104B may vary (e.g., in type, format, or style), within each page and/or across the pages 104A, 104B. Various examples of such post-type variations are provided in detail below. For example, in the context of a discussion board, it may occur that there are different types or classes of users of a particular discussion board. In such a case, it may occur that each class or type of user is associated with a different class or type of post. For example, some users may be classified as novice or beginner posters, while other users may be classified as experienced or long-term posters. Consequently, the experienced posters may have additional posting rights or capabilities, and, more generally, posts of the experienced users may vary in format as compared to posts of the novice or beginner posters. Of course, many types of such user classifications may be implemented, and may very widely in accordance with a type of the pages 104A, 104B, or based on a preference of a provider of the pages 104A, 104B.

In other examples, a single given user may have different types of posts, depending on circumstance or preference. For example, a given user may have multiple roles with respect to a particular discussion board, such as when a user may participate either as a site administrator, or as a general user.

In yet another example, a particular site may require that a user log in (e.g., using a username and password) in order to post content to pages of the site. In such settings, it may occur that posts of a user who is currently logged in will appear different in color, format, or other aspect while the user is currently logged in, as compared to when the same user is not currently logged in. Since it is apparent that such a user may be logged in at a given point in time, and not logged in at a given later point in time, it may be observed that an appearance of a given post of the user may vary correspondingly over time, as well.

In general, then, it may be appreciated from the above discussion that the pages 104A, 104B of a particular website may be characterized as having a generally static portion, such as the boilerplate content 110A, 110B, which may be the same or substantially the same across various ones of the pages of the website. In contrast, pages of the website in question may include dynamic, user-generated content which is added to the pages in response to user input, in a structured, repetitive, and therefore essentially predictable pattern. As just explained above, such dynamic, user-generated content may be referred to herein as post(s) (e.g., post 112A-112C, 114A, 114B), which may vary in type within and among the various pages of the website (e.g., may vary with respect to an identity or current preference or characteristic of a user providing the post in question, or may vary based on a structure of the website as defined by the site provider).

In operation, then, the template generator 102 may be configured to take into account these various characteristics of pages of a website when generating the site template 106. For example, as described in detail below, the template generator 102 may be configured to group pages of the website based on a similarity of included boilerplate portions. Further, the template generator 102 may be configured to characterize posts contained within the thus-grouped pages of the website, taking into account existing differences between the various types of posts that may be included therein. As a result, the site template 106 may be particularly well-suited to extract and characterize post data from a particular page of the website in question, even if the page and associated posts have not yet been created at a time of creation of the site template 106.

More specifically, the template generator 102 may include a page splitter 116 which receives all crawled pages of the website in question from the crawler 108, and proceeds to split such received pages into boilerplate portions and post portions. For example, as referenced above, the pages 104A, 104B may be produced and rendered using a suitable markup language. In this case, the crawler 108 may extract and characterize associated elements (e.g., tags) of the markup language used to create the pages 104A, 104B. Then, the page splitter 116 may be configured to receive such tags and other aspects of the crawled pages 104A, 104B, and to detect a presence of content to be characterized as boilerplate contained therein.

For example, the splitter 116 may be configured to identify a header tag within the crawled pages 104A, 104B, or other designated tags which are designated as being associated with boilerplate content. In another example, the page splitter 116 may be configured to analyze the crawled tags to determine a particular structure or content element which is essentially identical across two or more pages of the website, such as, for example, a block or window within pages 104A, 104B which appears identically therein at a top, side, or other specific position within the pages 104A, 104B.

As may be appreciated, such repetitive structures may be considered to be indicative of static boilerplate content which is included by the site provider within some or all of the pages of the website in question. In additional or alternative examples, the splitter 116 also may analyze actual content of the pages 104A, 104B. For example, the splitter 116 may determine that a particular phrase is repeated at the top of each of a group of webpages of the website in question, and may therefore deduce that such content represents a title or other static portion of pages of the website. Somewhat similarly, content of the pages 104A, 104B may be identified as including advertisements, which also may be considered to be an example(s) of boilerplate content.

Further, the splitter 116 may analyze tags, content, or other aspects of the crawled pages 104A, 104B, in order to determine a presence of posts (e.g., user-generated content) within pages of the website in question. For example, the page splitter 116 may again analyze specific tags from within the pages 104A, 104B, in order to deduce characteristics associated with such posts.

For example, in the context of a bulletin board, discussion threads may exist in which each subsequent comment of a discussion is indented further than a previous comment or contribution. In such a case, the page splitter 116 may observe such a progression of indentations, and may therefore deduce that the associated content represents posts provided by users. In other examples, the page splitter 116 may detect presence of certain formats or contents which are associated with user posts. For example, the page splitter 116 may detect six digit numbers which are thought to be associated with dates, since such dates are frequently included within posts in order to indicate a date of inclusion/update thereof.

In various implementations, then, the page splitter 116 may, e.g., identify potential boilerplate content (110A, 110B), remove or otherwise split such boilerplate content, and then subsequently assume that any remaining content includes user-generated posts. Conversely, the splitter 116 may detect a presence of user posts (e.g., in the manner described above), and may thereafter assume that any remaining content includes boilerplate content. In yet other implementations, the page splitter 116 may analyze content of the pages of the website in question independently to determine whether a given piece of content may be characterized as being boilerplate content or user-generated posts. Example techniques for determining a presence of user posts within a web page are provided, e.g., in U.S. patent application Ser. No. 12/533,959, titled PROVIDING POSTS TO DISCUSSION THREADS IN RESPONSE TO A SEARCH QUERY, and filed on Jul. 31, 2009.

Thus, many variations and implementations of the page splitter 116 exist, as would be apparent to one of skill in the art. For example, the page splitter 116 may characterize a given page completely independently of other pages of the website or a splitting thereof, or may use information derived from one or more other pages in determining whether and how to split a particular page. In other implementations, the page splitter 116 may assign a percentage of likelihood that particular content of a page in question is boilerplate content or user-generated posts. Then, content which is above a certain threshold of likelihood may be characterized as boilerplate or posts.

Once all desired pages of the website have been split wherever possible into boilerplate and post content, an aggregator 118 may be configured to group subsets of the thus-split pages. For example, as described in detail below, the aggregator 118 may be configured to group subsets of the pages based on similarity of the previously-determined boilerplate content.

More specifically, the aggregator 118 may include a boilerplate aggregator 118A which is configured to consider multiple pages of the website in question, and to group subsets thereof which are determined to have the same, or substantially the same, boilerplate content. In the example of FIG. 1, pages 104A, 104B of the website are illustrated as having the same or substantially the same boilerplate content 110A, 110B ("discussion board"). In this case, the boilerplate aggregator 118A may include the pages 104A, 104B, along with any other pages of the website which have sufficiently similar boilerplate content. Of course, it may be appreciated that, as discussed in more detail below with respect to FIG. 3, there may be additional pages of the website in question, (not specifically illustrated in FIG. 1) which have different boilerplate content than the pages 104A, 104B. In such a case, the boilerplate aggregator 118A may be configured to aggregate other such groups of similar pages, based on similarities therebetween with respect to boilerplate content.

Further with respect to the aggregator 118, a post-type aggregator 118B may be included, which may be configured to group posts of a particular type from within and among pages of each group output by the boilerplate aggregator 118A. In other words, as referenced above, the boilerplate aggregator 118 may input various examples of boilerplate content from the page splitter 116, and may output groups of pages having the same or similar boilerplate content. Then, from within each such group, the post-type aggregator 118B may be configured to examine all pages of the group, and to aggregate posts according to type within that page group.

For example, in the example of FIG. 1, as just referenced, it may be assumed that the pages 104A, 104B represent a group of pages of the website, as determined by the page splitter 116 and the boilerplate aggregator 118A. Then, it may be observed, as also referenced above, that the page 104A includes post 112A, 112B of a first post-type, while the page 104B includes one post of the first post-type (the post 112C), and two additional posts 114A, 114B of a second post-type.

For example, as referenced above, the posts 112A-112C may be associated with a first post-type that is associated with users who are currently logged into the website in question, while the posts 114A, 114B may be associated with users who currently are not logged into the website. In other examples, the posts 112A-112C may be associated with posts by a moderator, administrator, or owner of the website, while the posts 114A, 114B may be associated with general users of the website. In still other examples, the posts 112A-112C may be associated with users having a first characteristic (e.g., a high level of experience and/or long history of posting in association with the website), while the posts of the second post-type 114A, 114B may be associated with users having a different characteristic (e.g., users who are novices or beginners with respect to posting on the website). Many other examples of variations in type of the posts 112A-112C and 114A/114B may be observed. Other examples may include any characteristic of such posts which may vary with respect to particular aspects of the users providing the posts, a time or content of the post, or a preference of the posting user and/or an administrator of the website in question.

Thus, the pages 104A, 104B may be grouped with respect to other pages of the website, based on similarity of the boilerplate content 110A, 110B included therein. Then, posts of the first post-type 112A-112C may be similarly grouped together, based on similarity of characteristics there between, while posts of the second type 114A, 114B may themselves be grouped together, and separately from the grouping of the posts of the first post-type 112A-112C. It may be observed, in particular, that the posts of the first post-type 112A-112C are grouped together, notwithstanding the fact that the posts 112A, 112B appear in the context of the page 104A, while the remaining post 112C of the second post-type occurs within the context of the page 104B.

With respect to the aggregator 118, it may be observed that example techniques for aggregating pages or content thereof based on similarity of the content are generally known within the art, and therefore are not described here in detail. In general, such similarity measures may be based, for example, on a structure of the page(s) (or portions thereof). One example of techniques for determining page similarity using an underlying document object model (DOM) characterization technique is described in U.S. patent application Ser. No. 12/364,352, titled DETERMINING DOCUMENT SIMILARITY BASED ON TREE EDIT DISTANCE.

A merger 120 may be configured to receive aggregated content from the aggregator 118, and to merge boilerplate content and/or post-type content, for ultimate generation of the site template 106. For example, a boilerplate merger 120A may be configured to receive a group of pages of the website from the boilerplate aggregator 118A, and to output a merged boilerplate therefrom. For example, in the example of FIG. 1, the pages 104A, 104B constitute a group, based on similarity of the boilerplate content 110A, 110B. In the example, the boilerplate content 110A, 110B is exactly the same, so that the boilerplate merger 120A may simply output such common boilerplate content for use as a boilerplate within the site template 106, as described in detail below.

More generally, the boilerplate merger 120A may be configured to construct such a boilerplate template based on overall similarities of the boilerplate content within a group of pages in question. That is, as referenced herein, such boilerplate content may not be exactly the same within a given group of pages. In such a case, the boilerplate merger 120A may be configured to extract boilerplate elements of the overall boilerplate which are exactly the same, or which are sufficiently similar to be included within the boilerplate template of the site template 106. Again, various thresholds or other characteristics may be defined which designate an extent to which boilerplate content must be sufficiently similar to be included within the merged boilerplate content. In various example implementations, such thresholds may be defined loosely, so as to ultimately obtain the site template 106 which is, on the whole, relatively more inclusive and less accurate. In other implementations, such thresholds and conditions may be set more stringently or less inclusively, so as to obtain a site template 106 that is less inclusive but more accurate. Such design considerations are open to a designer of the system 100, based on preference and desired outcome.

Similarly to the boilerplate merger 120A, a post-type merger 120B may be configured to receive groups of posts of particular types from the post-type aggregator 118B, and to output merged versions thereof. For example, as referenced above, the post-type aggregator 118B may output a group of posts of the first post-type (112A-112C), and may output grouped posts of the second post-type (114A, 114B), which may be received by the post-type merger 120B. The post-type merger 120B may thus merge the posts 112A-112C of the first post-type, in a manner analogous to merging of the boilerplate by the boilerplate merger 120A. Similarly, the post-type merger 120B may merge the post 114A, 114B of the second post-type in a corresponding manner. Again, as referenced above with respect to the boilerplate content, the post-type merger 120b may be configured with respect to various design considerations, so as to be more likely to achieve a desired outcome during later implementation and use of the site template 106.

A post analyzer 122 may be configured to receive groups of posts of the various post-types, and examine all the posts of a particular post-type, in an attempt to identify or otherwise characterize individual elements of each post. Specific examples are provided in detail below, e.g., with respect to FIG. 3, but, in general, it will be appreciated that the post analyzer 122 may be configured to identify such expected post elements as post author, a date of the post, a text of the post, or any other element or aspect which may be of interest for characterizing the individual post.

For example, a set of annotation criteria 124 may be available, which the post analyzer 122 may use to analyze (e.g., characterize or classify) post elements of a given post-type/group. For example, as just referenced, a first annotation scheme of post elements may include annotation of content as one of author/date/text, while another annotation scheme may seek to specify author/date/text/user status. A designer of the system 100 may select between various available annotation schemes, depending on a type of the pages 104A, 104B, and/or on a desired outcome for the site template 106.

By virtue of the above-described grouping of individual posts based on post-type, the post analyzer 122 may be operable to identify (and subsequently annotate) elements thereof with a high degree of accuracy and completeness. For example, posts of a first post-type (e.g., 112A-112C) may include a post author name in a specific format or location, whereas posts of the second type (e.g., 114A, 114B) may include a post author name in a different format or location. Thus, by grouping the posts according to post-type, the post analyzer 122 may be provided with groups of posts which are generally more similar to one another, so that an analysis and characterization (e.g., annotation) of these posts will be more likely to yield complete, consistent, and correct results.

The post analyzer 122 may continue providing such analysis for each group of posts having a particular post-type, until all such groups within the larger group of pages having the same boilerplate have been examined and characterized. The template generator 102 may then output the site template 106, such that the site template 106 includes the boilerplate template output by the boilerplate merger 120A, shown within the site template 106 as boilerplate template 106A. The site template 106 may further include a first post-type template 106B corresponding to the template for posts 112A-112C of the first post-type, and a second post-type template 106C corresponding to posts 114A, 114B of the second post-type.

In this way, the site template 106 may effectively include sub-templates 106A, 106B, 106C, where the post-type templates 106B, 106C are, as just described, annotated with information characterizing individual elements thereof. Consequently, as referenced above, the site template 106 may be applied to the pages 104A, 104B, or to other pages of the website in question, so as to extract and annotate post elements of any post which correspond to posts of the first type or posts of the second type. In this way, the site template 106 allows a user of the system 100 to extract, annotate/classify, and store data from the website, in a manner which provides for search, storage, or other use of the pages and page content.

Various additional or alternative implementations of the system 100 would be apparent to one of skill in the art. For example, in the examples provided above, the boilerplate template 106A is described as resulting from a simple merger of extracted boilerplates which are found to be similar to one another across a corresponding group of pages. In other words, there may be no need or effort to analyze such a boilerplate template in the sense of the post analyzer 122, because it is assumed that there is no need or desire to search content of the boilerplate, and/or because there is a relatively small amount of variation between the merged boilerplate portions. In other implementations, however, it may be necessary or desirable to characterize content of the boilerplate, in a similar manner to that which is described above with respect to the posts and the post analyzer 122. Various other additional or alternative implementations would be apparent.

Figure 2:
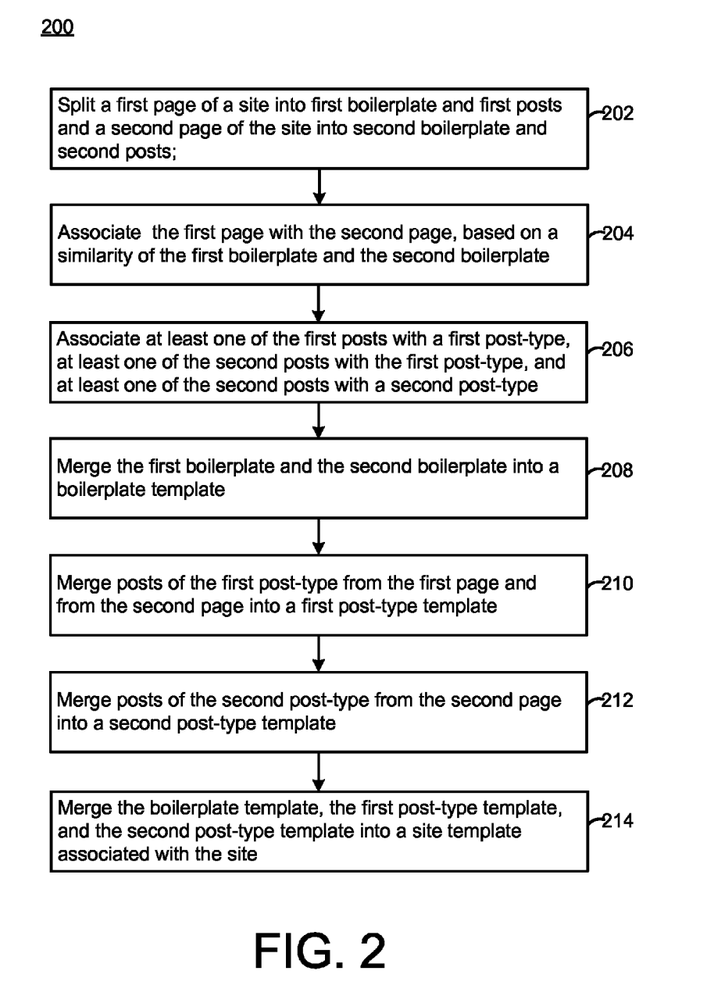
FIG. 2 is a flowchart illustrating example operations of the system of FIG. 1.

FIG. 2 is a flowchart 200 illustrating example operations of the system 100 of FIG. 1. More specifically, operations 202-214 are illustrated as showing possible executions of one or more operations of the system 100. In the example of FIG. 2, the operations 202-214 are illustrated in sequential order. It may be appreciated, however, that such illustration is merely an example, and that the operations 202-214 may also be implemented differently, e.g., in a different order than that illustrated, or in parallel, and/or with two or more of the operations 202-214 executing in a partially or wholly overlapping manner. Further, additional or alternative operations may be executed during other implementations of the system 100.

In FIG. 2, a first page of a site may be split into first boilerplate and first posts, and a second page of the site may be split into second boilerplate and second posts (202). For example, with reference to FIG. 1, the splitter 116 may be configured to split the first page 104A into first boilerplate 110A and first posts 112A, 112B. The splitter 116 may be further configured to split the second page 104B into the second boilerplate 110B and second posts 114A, 114B, 112C. Of course, as explained above, additional pages of a particular website may be split in a similar fashion as part of the execution of the operation 202.

The first page may be associated with the second page, based on a similarity of the first boilerplate and the second boilerplate (204). For example, the boilerplate aggregator 118A of the aggregator 118 may be configured to inspect the boilerplate 110A and the boilerplate 110B, and to determine a substantial or sufficient similarity there between. Of course, as described herein, the boilerplate aggregator 118A may be configured to group more than the first and second pages described herein, e.g., may group three or more pages based on similarity of included boilerplate content. However, the examples of FIGS. 1 and 2 describe and illustrate only the two pages 104A, 104B with specificity, for the sake of clarity and simplicity. In this way, the boilerplate aggregator 118A may be configured to group pages based on similarity of boilerplate content, to thereby define a group of pages within which posts may be categorized and aggregated based on a type of each such post, as described herein.

At least one of the first posts may be associated with a first post-type, and at least one of the second posts may be associated with the first post-type, while at least one of the second posts may be associated with the second post-type (206). For example, the post-type aggregator 118B of the aggregator 118 may be configured to associate the post of 112A, 112B of the first posts, and the post 112C of the second posts, as being posts of the first post-type. Similarly, the post-type aggregator 118B may be configured to associate the posts 114A, 114B of the second posts as posts of the second type. Thus, as explained above, it may be observed that posts of a given type may be aggregated both within and among analyzed pages of the website, and aggregated into groups, based on post-type.

The first boilerplate and the second boilerplate may be merged into a boilerplate template (208). For example, the boilerplate merger 120A of the merger 120 may be configured to merge the boilerplates 110A, 110B, as referenced above. For example, in circumstances where the boilerplate 110A and 110B are identical, such merging may simply correspond to inclusion of the common boilerplate content. In other examples, where some degree of difference exists between the boilerplate 110A and the boilerplate 110B, merging may proceed by retaining portions of each boilerplate 110A, 110B which are common, while omitting or modifying portions which are not identical between the two boilerplate contents 110A, 110B.

Posts of the first post-type from the first page and posts of the first post-type from the second page may be merged into a first post-type template (210). For example, the post-type merger 120B of the merger 120 may be configured to merge the posts 112A, 112B of the first posts, together with the post 112C of the second posts (previously grouped together by the post-type aggregator 118B), to thereby merge posts 112A, 112B, 112C of the first post-type into a first post-type template 106B.

In some cases, it may be sufficient or desirable to proceed with the first post-type template 106B based on the just-described merging operations of the post-type merger 120B. In many cases, however, as described above, it may be desirable or necessary to analyze content of the post of the first post-type, to thereby annotate or otherwise characterize elements thereof using a predefined annotation criteria/element set (e.g., author, date, post text). For example, the post analyzer 122 may be configured to analyze the merged posts 112A, 112B, 112C in order to annotate specific elements or portions thereof based on the annotation criteria 124, as referenced above and described below in more detail with respect to FIGS. 3 and 4.

Similarly, posts of the second post-type from the second page may be merged into a second post-type template (212). For example, as just described, the post-type merger 120B may be configured to merge the posts 114A, 114B of the second page 104B into the second post-type template 106C. As also described above, it may be necessary or desirable to annotate or otherwise characterize specific elements or portions of the post of the second post-type 114A, 114B, according to the predefined annotation criteria 124. For example, again, the post analyzer 122 may be configured to analyze the post 114A, 114B of the second post-type, and thereby output the second post-type template 106C as including annotated post elements, as described herein.

The boilerplate template, the first post-type template, and the second post-type template may be merged into a site template associated with the site (214). For example, the template generator 102 may be configured to output the site template 106 including the boilerplate template 106A, the first post-type template 106B, and the second post-type template 106C, as shown and described herein.

In this way, as described, the site template 106 may be generated which allows the user of the system 100 to apply the annotation criteria 124 against posts of the first page 104A, the second page 104B, or any other page of the website in question which may be associated with the corresponding boilerplate content, as determined by the boilerplate template 106A. Consequently, such a user may be provided with complete, consistent, and accurate characterizations of posts and post content, for use in analyzing, searching, storing, or otherwise using pages of the website in question.

Figure 3:
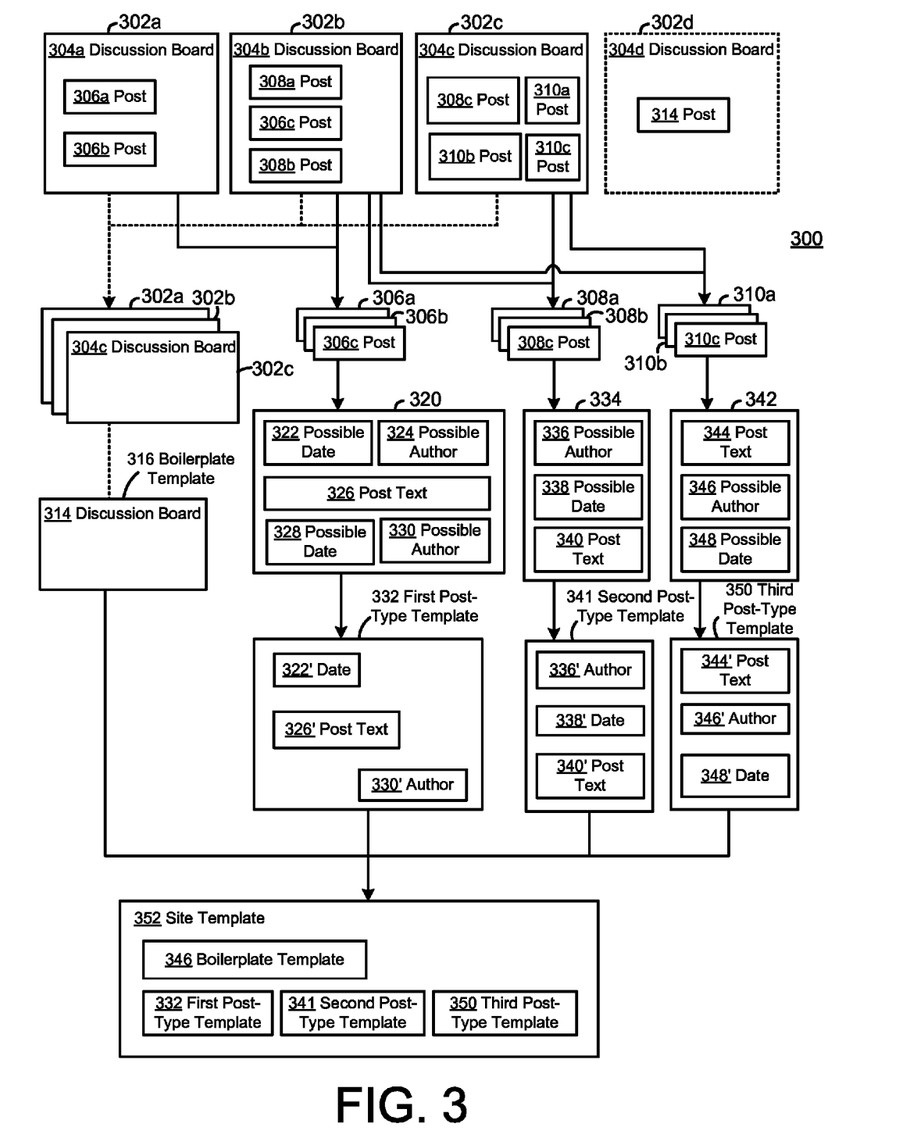
FIG. 3 is a block diagram illustrating additional or alternative example implementations of the system of FIG. 1.

FIG. 3 is a block diagram of an example implementation of the system of FIG. 1. In the example of FIG. 3, a plurality of webpages 302A, 302B, 302C of a website have been selected for analysis by the system 100. As shown, the webpages 302A, 302B, 302C include, respectively, boilerplate content 304A, 304B, 304C, "discussion board." Further, the webpage 302A includes posts of a first post-type illustrated as post 306A, 306B. The webpage 302B includes a third post of the first post-type shown as post 306C, and posts 308A, 308B of a second post-type. Further, the webpage 302C includes a post 308C of the second post-type, as well as posts 310A, 310B, 310C of a third post-type.

As described above, subsequent to appropriate crawling or related analysis of the webpages 302A, 302B, 302C, the page splitter 116 may be configured to split each of the webpages 302A, 302B, 302C into boilerplate content and posts. Specifically, as shown, the page splitter 116 may be configured to split the webpages 302A, 302B, 302C into boilerplate content, which, as shown in FIG. 3, includes the boilerplate content 304C "discussion board" (as well as 304B, 304A, not specifically visible in the example of FIG. 3).

Upon splitting of the boilerplate content 304A-304C from the various posts 306A-306C, 308A-308C, 310A-310C, the boilerplate aggregator 118A may be configured to examine the boilerplate content 304A-304C, and to determine that sufficient similarity exist there between, perhaps as compared to other crawled pages of the website (not specifically shown in FIG. 3) to aggregate or otherwise group the boilerplate content 304A-304C, and thereby associate the webpages 302A-302C with one another for purposes of constructing a corresponding site template.

Similarly, post-type aggregator may be configured to group the various posts within and among the webpages 302A, 302B, 302C, based on post-type. For example, posts of the first post-type may be associated with users who are currently logged in to the website, while posts of the second post-type may be associated with users who are currently not logged in. Posts of the third type may be associated with a moderator or administrator of the website. As shown, then, the posts 306A, 306B, 306C of the first post-type may be split from their corresponding boilerplate content 304A, 304B and grouped, while posts 308A, 308B, 308C may similarly be split from their corresponding boilerplate content 304B, 304C and grouped. Similarly, the post 310A, 310B, 310C, may be grouped together.

I conjunction with the aggregation of the boilerplate and posts (according to post-type), the boilerplate merger 120A may proceed to merge the boilerplate content 304A, 304B, 304C into a boilerplate template 316. As shown in the example of FIG. 3, such merger may simply include inclusion of common content of the boilerplate content 304A, 304B, 304C, shown in FIG. 3 as "discussion board" 318. As discussed above, however, the boilerplate merger 120A, and other examples, may be configured to discard, combine, or otherwise merge portions of the boilerplate content which are not identical between the pages 302A, 302B, 302C, in order to arrive at the boilerplate template 316.

For example, the webpage 302A may be the first page of the website, and may include certain disclaimers about use of the website in association with the boilerplate content 304A. Such disclaimers may not appear in subsequent pages 302B, 302C. Nonetheless, the boilerplate aggregator 118A may group the pages 302A, 302B, 302C, based on correspondence of the boilerplate content notwithstanding such disclaimers. Then, the boilerplate merger 120A may not include the disclaimers when constructing the boilerplate template 316. Other examples and variations would be apparent to one of skill in the art.

Similarly, the post-type merger 120B may be configured to merge posts 306A, 306B, 306C of the first post-type, to obtain the merged post of the first post-type, illustrated as merge post 320. Further, the post-type merger 120B may be configured to merge posts 308A, 308B, 308C of the second post-type into a merged post 334 for the second post-type. Finally, the post-type merge 120B may be configured to merge the posts 310A, 310B, 310C into a merged post 342 of the third post-type.

In the merged post 320 of the first post-type, a number of fields or elements are included, including, in the example, a possible date 322, a possible author 324, post text 326, and a possible date 328, and a possible author 330. For example, the possible date 322 may include eight numerals in the format XX/XX/XXXX. Meanwhile, the possible date 328 may include six numerals in the format XX/XX/XX. Similarly, the possible author fields 324, 330 may include text commonly associated with a first name or last name, or with a screen name. Meanwhile, the post text 326 may include text of a certain format or length.

It may be appreciated that the merged post 320 may be obtained using similar techniques to those described above with respect to the boilerplate template 316. That is, for each discrete field, element, or other portion of the post 306A-306C, the post-type merger 120B may be configured to merge those portions which are identical, or substantially identical or similar. At time of merging, such merging may proceed without regard to possible content or characterization of such field, element, or other portions. Then, the post analyzer 122 may be configured to examine or otherwise analyze the best-merged portions, in an attempt to annotate or otherwise characterize the merged portions according to the annotation criteria 124. It is in this regard that the various merged portions of the merge post 320 may initially be characterized as having formats or other characteristics which are potentially associated with a particular annotation according to the annotation criteria 124 (e.g., dates, post text, authors, or other possible annotations).

Then, upon further analysis by the post analyzer 122, a first post-type template 332 may be determined from the merge post 320. That is, the post analyzer 122 may analyze the fields 322-330 which are considered to be possibly associated with annotations of the annotation criteria 124, and thereby proceed to actually annotate particular content of the merge post 320. For example, as shown, the possible dates 322-328 may be considered by the post analyzer 122. The post analyzer 122 may determine that the possible date 328 of the format XX/XX/XX includes examples within the post 306A, 306B, 306C, in which the first field XX and the second field XX both include numbers which are 13 or higher, so that it may be determined that neither field represents a month of the year, so that the possible date 328 may be excluded from being annotated as a date field.

More generally, the post analyzer 122 may be configured to consider both the location and pattern of a possible date across one or more webpages and post-types, and base a determination for adding a date annotation using a pattern which is most reasonable across an entire webpage and/or set(s) of post-types. For example, May 31, 2007 observed in two different posts or post-types may indicate higher certainty that May 6, 2007 means May 6th (as May 31, 2007 cannot mean the 5th day of the 31st month). Thus, by picking the best pattern instead of simply the best location for a date, the resulting site template 106 may ultimately be more likely to make a correct determination when annotating possible date fields.

Somewhat similarly, the possible author field 324 may include characteristics which exclude the field 324 from being considered as including a name or screen name of an author of the post text 226. For example, at least one of the posts 306A-306C may include an example of the possible author field 324 in which the text can not be recognized as a name, or in which the text violates a rule required for screen names of users of the website. Meanwhile, the possible author field 330 may be analyzed and discovered to include essential or determined examples of names and/or screen names, so that the first post-type template 332 may include an annotated author field 330'. In the example of FIG. 3, the post text 326 of the merged post 320 is considered to include text of a link or other characteristic which is associated with user posts, and is not illustrated as being associated with other fields or portions of the post 306A-306C which may be possibly considered to include such post text, and therefore may be included within the first post-type template 332 as post text 326'. Thus, as with the previously-described annotated date field 322', the first post-type template 332 may be completed.

Similar comments apply to the merge post 334 and 342 of the post 308A-308C of the second type, and of the post 310A-310C of the third type, respectively. Specifically, as shown, the merge post 334 includes a possible author field 336, possible date field 338, and post text 340. In this example, a second post-type template 341 may be constructed which includes annotated author, date, and post text fields, respectively 336', 338', 340', as shown. Similarly, the merged post 342 includes post text field 344, a possible author field 346, and a possible date field 348. Consequently, a third post-type template 350 may be constructed including annotated portions 344' associated with post text, 346' associated with a post author, and 348' associated with a date.

Of course, the example of FIG. 3 is simplified for the sake of clarity of explanation, and it may be understood that many other variations are contemplated. Nonetheless, it may be observed even from the simple example of FIG. 3, that the system 100 of FIG. 1 provides a substantial flexibility in constructing the various post-type templates 332, 341, 350. For example, it may be observed, that the various post-type templates may differ with regard to an arrangement or content of the various annotated fields within the post-type templates. Consequently, as referenced above, the various post-type templates may be more likely to accurately recognize, extract, and annotate or otherwise characterize elements of webpages of the website.

Specifically, as may be understood from the above description of FIG. 1, the post-type template 352 may be constructed which includes the boilerplate template 316, the first post-type template 332, second post-type template 341, and the third post-type template 350. As may be appreciated, the site template 352 may thus be applied to any of the pages 302A-302C, or to other pages of the website.

For example, a page 302D is illustrated which may be considered to be another page of the website. For example, the page 302D may be constructed in the future, after construction of the site template 352, perhaps based on future posts of the various uses of the website. In this case, the site template 352 may be applied thereto.

For example, the site template 352 may be applied to the page 302D, including application of the boilerplate template 316 to the page 302D. Upon the resulting determination of similarity of boilerplate content 304D to the boilerplate template, the remaining post-type template 332, 341, 350, may be applied to a post 314.

It may be appreciated, that the post 314 may be a post of the first post-type, of the second post-type, or of the third post-type. By application of the site template 352, for example, it may be determined that the post 314 is a post of the first post-type, corresponding to the first post-type template 332. In this case, the post 314 may be analyzed to extract and annotate or otherwise characterize a date from the date field 322', post text from the post text 326', and author information from the author field 330'. Then, as discussed, such extracted annotated data may be appropriately stored, and/or otherwise used to search, analyze, or otherwise characterize the post 314, and thus the page 302D.

Figure 4:
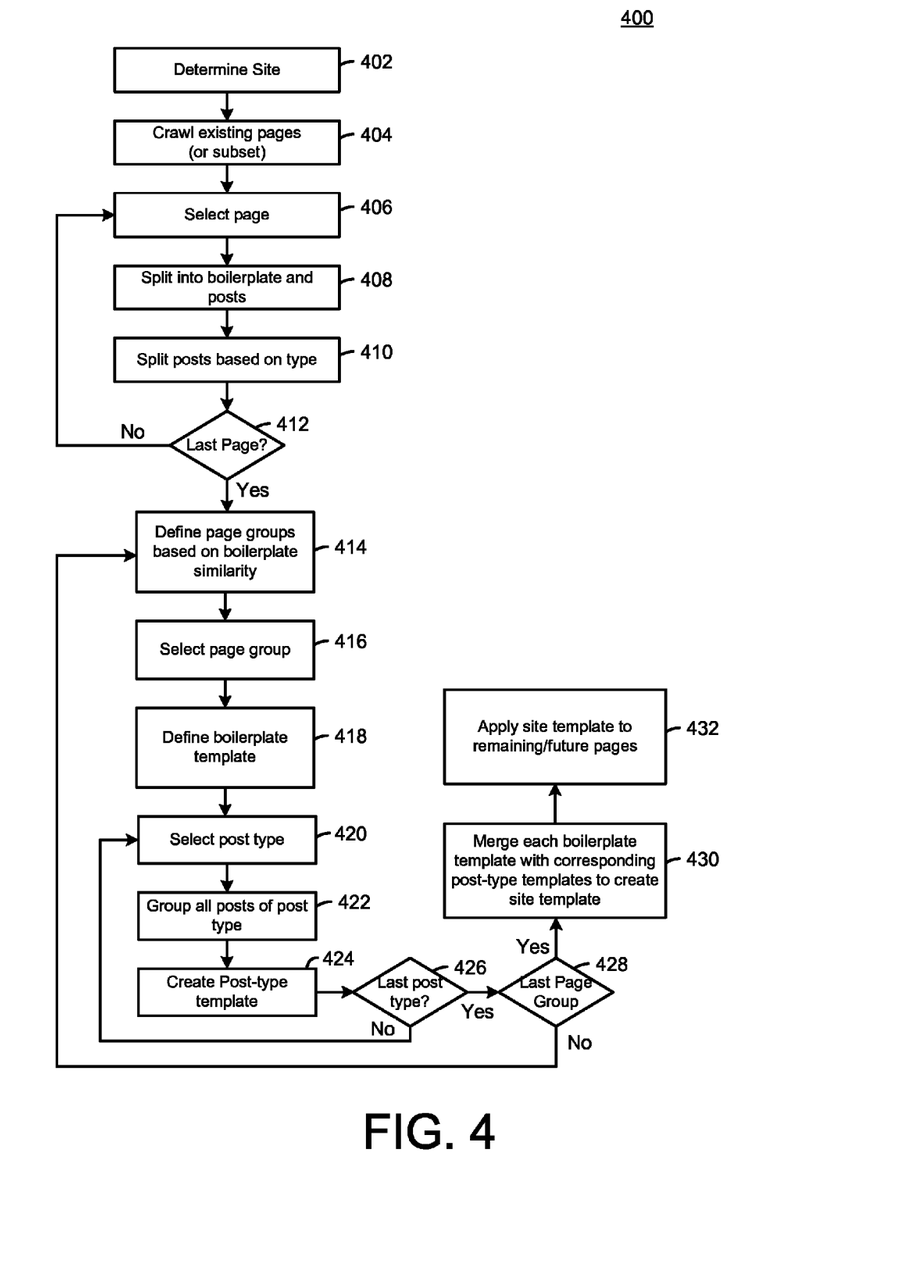
FIG. 4 is a flowchart illustrating additional or alternative example operations of the system of FIGS. 1 and/or 3.

FIG. 4 is a flowchart 400 illustrating additional or alternative example operations of the system 100 of FIG. 1, with reference to the example of FIG. 3. In the example of FIG. 4, a website is determined (402). For example, the template generator 102 may be configured, perhaps in association with the web crawler 108, to crawl or otherwise search the internet to determine websites which may potentially include repeated/structured data, which may be considered to include user-generated content. A human user may be requested to characterize resulting searches as including or not including desired user-generated content. In other example implementations, a field may be provided to such a human user to receive specific destination of a particular website for construction of a site template with respect thereto.

Then, existing pages (or subsets thereof) may be crawled (404), e.g., by the crawler 108. As referenced above, in general, such crawling is known in the art, and is not described here in detail, but may generally include extraction of markup tags, page links, content, linked content, or other characteristics of each selected page of the website. Further, as described above, the crawler 108 may be applied to all existing pages of the website in question. In other implementations, the crawler 108 may only be applied to such pages which have been created within a recent and defined timed window, so as to obtain the most recent and therefore relevant subset of pages of the website. In other implementations, the crawler 108 may be applied to a subset of the pages of the website that is defined differently, e.g., based on content of the pages or preference of the user of the system 100.

The page splitter 116 may then select or otherwise receive the first page of the crawled pages (406), and may analyze the page to split the page into boilerplates (408) and into posts (410). For example, as described, the splitter 116 may split the DOM tree of a crawled page into two parts: the boilerplate of the page(s), associated with parts of the DOM tree which are (sufficiently) common between all of these pages, and the post data, i.e., repeated structures which differ in both count and content across the page(s).

If a last page of the crawled pages has not been reached (412), then searching of the next page may occur (406). The page splitter may continue to split the selected page and to boilerplates (408) and into posts (410). This process may continue until the last page of a set of crawled pages have been reached (412).

Groups of pages may be defined based on similarity of the thus-split boilerplate content (414). For example, in the example of FIG. 3, the pages 302A-302C may be grouped based on similarity of boilerplate content 304A-304C as described above. As also referenced above, various other pages of the website (not shown) may be similarly grouped as having different but eternally-similar boilerplate content. Consequently, a result of the operations of the boilerplate aggregator 118A may include two or more groups of pages, each group having common or substantially common boilerplate content, as described above.

Then, the first such page group may be selected (416), and the boilerplate merger 120A may proceed to define a corresponding boilerplate template for the selected page group (418). Within the page group, the various included posts may be grouped or otherwise aggregated, according to possible post-types (420). For example, as referenced above, the post-type aggregator 118B may examine all the posts of the page group in question, in order to determine a level of similarity (or lack thereof) between various posts. For example, the post-type aggregator 118B may be configured to execute a similar operation as described above with respect to the boilerplate aggregator 118A, when constructing the various page groups.

For a first post-type of the thus-determined post-types, all corresponding posts may be grouped (422), and a corresponding post-type template may be created (424). For example, as described above with respect to FIGS. 1 and 3, the post 306A, 306B of the first type may be grouped and subsequently merged by the post-type merger 120B into the merge post 320, whereupon the post analyzer 122 may access the annotation criteria 124 to label portions of the merge post 320 and thereby obtain the first post-type template 332.

If the thus-created post-type template is not associated with a final post-type of the determined post-types (426), then a next post-type may be selected (420). Operations may proceed with grouping/merging of the posts of the thus-selected post-type (422), and subsequent creation of a post-type template (424). For example, with respect to FIGS. 1 and 3, the posts of the second post-type 308A-308C may be grouped and merged into the merge post 324, e.g., by the post-type aggregator 118B and the post-type merger 120B. The post analyzer 122 may again apply the annotation criteria 124 to the merge 334, to thereby obtain the post-type template 341.

The determination may be made that the second post-type is not the final post-type of the page group in question (426), so that operations 420-424 may proceed to be executed with respect to post 310A-310C of the third post-type. In the example of FIG. 3, where the post of the third post-type represents the last post-type (426), then it may be determined whether the thus-analyzed page group represents the last page group (428). If not, selection may proceed with a subsequent page group (416). In the example of FIG. 3, only the group of pages 302A-302C is illustrated, so that operations may proceed with merger of each boilerplate template with corresponding post-type templates to create a site template (430). For example, as described above, the site template 106 or the site template 352 may thus be created.

As described, the thus-created site template may be applied to remaining or future pages of the website (432). In this way, such pages may be analyzed, so that content thereof may be extracted and annotated or otherwise characterized, for use in storing, searching, or otherwise using such content, and/or characterizing (e.g., ranking or scoring), each such page for use in subsequent searching thereof. As a result, a utility and availability of the website in question may be improved.

Figure 5:
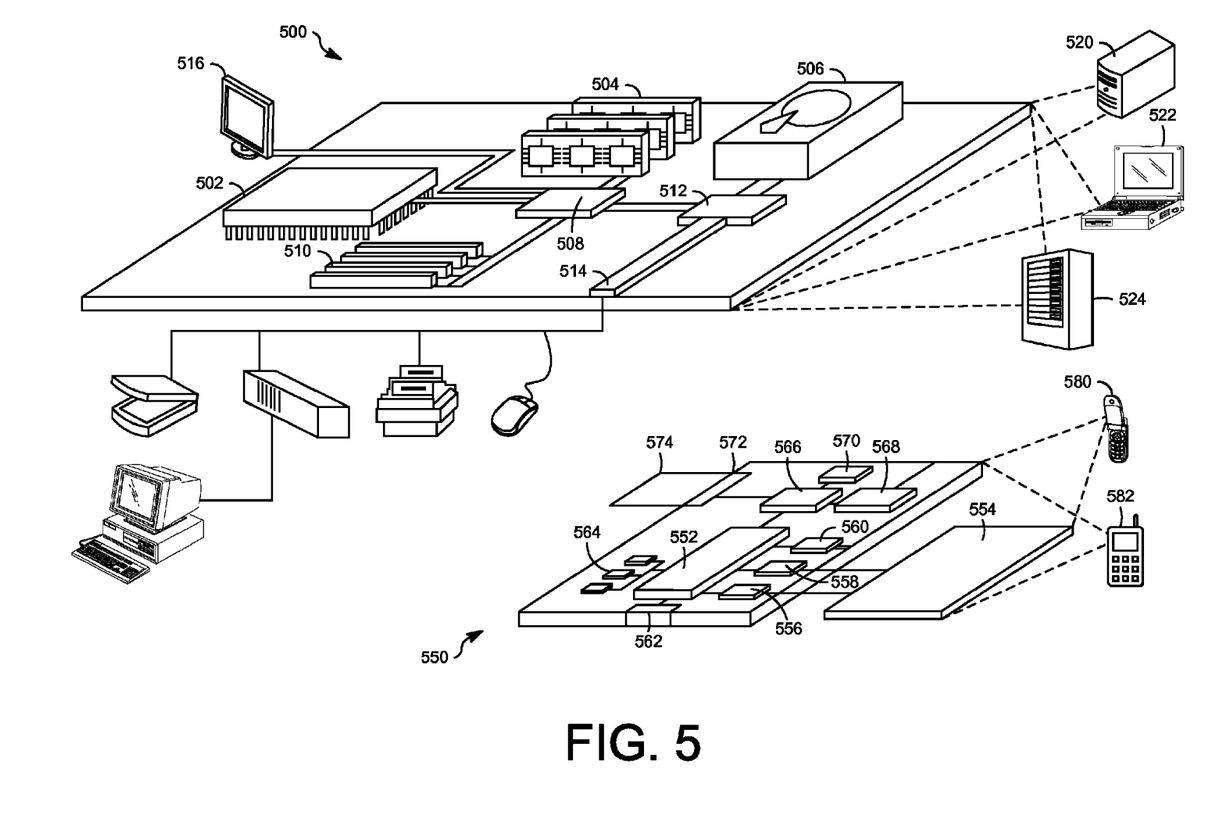
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a computer-readable medium, the computer system comprising:
   at least one processor;
   a page splitter configured to cause the at least one processor of the computer system to split a first page of a site into first boilerplate and first posts, and a second page of the site into second boilerplate and second posts;
   an aggregator configured to cause the at least one processor of the computer system to associate the first page with the second page, based on a similarity of the first boilerplate and the second boilerplate, and configured to associate at least one of the first posts and at least one of the second posts with a first post-type, and at least one of the second posts with a second post-type; and
   a merger configured to cause the at least one processor of the computer system to merge the first boilerplate and the second boilerplate into a boilerplate template, posts of the first post-type from the first page and from the second page into a first post-type template, and posts of the second post-type from the second page into a second post-type template, and further configured to merge the boilerplate template, the first post-type template, and the second post-type template into a site template associated with the site.

2. The system of claim 1, comprising:
a post analyzer configured to analyze merged posts of the first post-type and to extract elements therefrom and to annotate the elements based on annotation criteria for inclusion within the first post-type template.

3. The system of claim 2, wherein the first posts and the second posts include user-generated content, and wherein the annotation criteria includes labels for labeling the elements including a text label, an author label, and a date label to be associated with each post of the first posts and the second posts.

4. The system of claim 1, wherein the page splitter is configured to receive the first page and the second page including received crawled page data therefor from a crawler.

5. The system of claim 1, wherein the first posts and the second posts include user-generated content.

6. The system of claim 1, wherein site includes a discussion forum and the first page and the second page include user-generated content included within the discussion forum.

7. The system of claim 6, wherein the posts of the first post-type are defined by type based on a characteristic of corresponding users from whom the posts of the first post-type are received.

8. The system of claim 1, wherein the site template is applicable to a page of the site to extract and annotate elements of posts of the page.

9. The system of claim 1, wherein the merger includes a boilerplate merger configured to merge the first boilerplate and the second boilerplate into the boilerplate template based on a measure of similarity therebetween, relative to at least one other page of the site.

10. The system of claim 1, wherein the merger includes a post-type merger configured to merge the posts of the first post-type into the first post-type template based on a measure of similarity therebetween.

11. A computer-implemented method including executing instructions stored on a computer-readable medium, the method comprising:
splitting a first page of a site into first boilerplate and first posts and a second page of the site into second boilerplate and second posts;
associating the first page with the second page, based on a similarity of the first boilerplate and the second boilerplate;
associating at least one of the first posts with a first post-type, at least one of the second posts with the first post-type, and at least one of the second posts with a second post-type;
merging the first boilerplate and the second boilerplate into a boilerplate template;
merging posts of the first post-type from the first page and from the second page into a first post-type template;
merging posts of the second post-type from the second page into a second post-type template; and
merging the boilerplate template, the first post-type template, and the second post-type template into a site template associated with the site.

12. The method of claim 11, comprising:
analyzing merged posts of the first post-type to extract elements therefrom; and
annotating the elements based on annotation criteria for inclusion within the first post-type template.

13. The method of claim 12, wherein the first posts and the second posts include user-generated content, and wherein the annotation criteria includes labels for labeling the elements including a text label, an author label, and a date label to be associated with each post of the first posts and the second posts.

14. The method of claim 11, wherein splitting the first page of the site into first boilerplate and first posts and the second page of the site into second boilerplate and second posts comprises:
receiving the first page and the second page including received crawled page data therefor from a crawler.

15. The method of claim 11, wherein the first posts and the second posts include user-generated content.

16. The method of claim 15, wherein the posts of the first post-type are defined by type based on a characteristic of corresponding users from whom the posts of the first post-type are received.

17. A computer system comprising: one or more computing devices programmed to perform operations including:
splitting pages of a site containing user-generated content into boilerplate and post data,
aggregating a page group of the split pages, based on similarity of boilerplate contained within the page group,
aggregating groups of the posts within and among the pages of the page group, based on a post-type of posts within each group of posts,
analyzing posts of each post-type and corresponding post group, to extract elements therefrom, and
annotating the elements based on annotation criteria for inclusion within post-type templates corresponding to each post-type and corresponding post group.

18. The computer system of claim 17, wherein one or more of the computing devices are programmed to perform further operations including:
merging the boilerplate of the page group into a boilerplate template; and
merging the posts of each post-type and corresponding post group into a corresponding merge post, for subsequent analysis and annotation thereof to obtain a corresponding post-type template.

19. The computer system of claim 18, wherein one or more of the computing devices are programmed to perform further operations including:
including the boilerplate template and post-type templates into a site template for the site.

20. The computer system of claim 17, wherein posts of a post-type are defined based on a characteristic of corresponding users from whom the posts of the post-type are received.

21. A computer system comprising:
one or more computing devices programmed to perform operations including
splitting a first page of a site into first boilerplate and first posts, and a second page of the site into second boilerplate and second posts;
associating the first page with the second page, based on a similarity of the first boilerplate and the second boilerplate, and configured to associate at least one of the first posts and at least one of the second posts with a first post-type, and at least one of the second posts with a second post-type; and
merging the first boilerplate and the second boilerplate into a boilerplate template, posts of the first post-type from the first page and from the second page into a first post-type template, and posts of the second post-type from the second page into a second post-type template, and further configured to merge the boilerplate template, the first post-type template, and the second post-type template into a site template associated with the site.

22. The system of claim 21, wherein one or more of the computing devices are programmed to perform further operations including:

analyzing merged posts of the first post-type and to extract elements therefrom and to annotate the elements based on annotation criteria for inclusion within the first post-type template.

23. The system of claim 21, wherein the first posts and the second posts include user-generated content.

24. The system of claim 21, wherein the merging includes boilerplate merging configured to merge the first boilerplate and the second boilerplate into the boilerplate template based on a measure of similarity therebetween, relative to at least one other page of the site.

25. The system of claim 21, wherein the merging includes a post-type merger configured to merge the posts of the first post-type into the first post-type template based on a measure of similarity therebetween.

\* \* \* \* \*